(12) United States Patent  
Ishida

(10) Patent No.: US 8,727,926 B2  
(45) Date of Patent: May 20, 2014

(54) VEHICLE DOOR DRIVING DEVICE

(75) Inventor: Toshihiko Ishida, Niwa-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/810,854

(22) PCT Filed: Sep. 13, 2011

(86) PCT No.: PCT/JP2011/070778  
§ 371 (c)(1),  
(2), (4) Date: Jan. 17, 2013

(87) PCT Pub. No.: WO2012/039313  
PCT Pub. Date: Mar. 29, 2012

(65) Prior Publication Data  
US 2013/0123056 A1  May 16, 2013

(30) Foreign Application Priority Data

Sep. 24, 2010  (JP) ................................ 2010-213522

(51) Int. Cl.  
*F16H 48/06* (2006.01)

(52) U.S. Cl.  
USPC .......................................... 475/157; 475/347

(58) Field of Classification Search  
USPC ......... 475/5, 9, 149, 156, 157, 317, 331, 346, 475/347  
See application file for complete search history.

(56) References Cited

U.S. PATENT DOCUMENTS

| | | | |
|---|---|---|---|
| 4,612,729 A | 9/1986 | Sato | |
| 5,669,843 A | 9/1997 | Bolton et al. | |
| 6,460,295 B1 * | 10/2002 | Johnson et al. | 49/360 |
| 6,676,556 B2 * | 1/2004 | Ishihara et al. | 475/269 |
| 7,244,213 B2 * | 7/2007 | Gueler et al. | 475/317 |
| 2007/0163179 A1 | 7/2007 | Fukumura et al. | |
| 2008/0053781 A1 | 3/2008 | Kita | |

(Continued)

FOREIGN PATENT DOCUMENTS

| | | |
|---|---|---|
| JP | 59-69553 A | 4/1984 |
| JP | 59-192176 A | 10/1984 |

(Continued)

OTHER PUBLICATIONS

International Search Report (PCT/ISA/210) issued on Dec. 13, 2011, by the Japanese Patent Office as the International Searching Authority for International Application No. PCT/JP2011/070778.

(Continued)

*Primary Examiner* — Justin Holmes  
(74) *Attorney, Agent, or Firm* — Buchanan Ingersoll & Rooney PC

(57) ABSTRACT

A driving mechanism is arranged such that at least a part is contained within a space corresponding to the external shape of a driving motor, that is, within a space corresponding to a distance in the radial direction of the driving motor. The driving mechanism comprises a pinion, a transmission gear, a ring gear that forms a fixed axis, and a carrier. The pinion is connected to a rotary shaft of the driving motor. The transmission gear has a disk gear portion that meshes with the pinion, and a sun gear portion that is located on the same side as the pinion with respect to the disk gear portion. The carrier has a planet gear and rotates with a drum.

14 Claims, 10 Drawing Sheets

(56) References Cited

U.S. PATENT DOCUMENTS

| | | |
|---|---|---|
| 2009/0019773 A1* | 1/2009 | Gruhn et al. .................. 49/28 |
| 2012/0053001 A1* | 3/2012 | Blech et al. .................. 475/149 |
| 2012/0204663 A1 | 8/2012 | Ishida et al. |
| 2013/0079189 A1 | 3/2013 | Kobayashi et al. |
| 2013/0180348 A1* | 7/2013 | Andres et al. ................. 74/89.14 |

FOREIGN PATENT DOCUMENTS

| | | |
|---|---|---|
| JP | 8-308176 A | 11/1996 |
| JP | 11-13336 A | 1/1999 |
| JP | 2003-082927 A | 3/2003 |
| JP | 2005-207500 A | 8/2005 |
| JP | 2008-063762 A | 3/2008 |
| JP | 2009-523983 A | 6/2009 |
| JP | 4504042 B2 | 7/2010 |
| JP | 2010-236244 A | 10/2010 |
| WO | WO 2007/084289 A2 | 7/2007 |

OTHER PUBLICATIONS

International Preliminary Report on Patentability (PCT/IB/338) and Written Opinion of the International Searching Authority (PCT/ISA/237) in the corresponding International Patent Application No. PCT/JP2011/070778 and English Translation of the Written Opinion.

Office Action issued on Feb. 4, 2014, by the Japanese Patent Office in corresponding Japanese Patent Application No. 2011-205127, and an English Translation of the Office Action. (5 pages).

\* cited by examiner

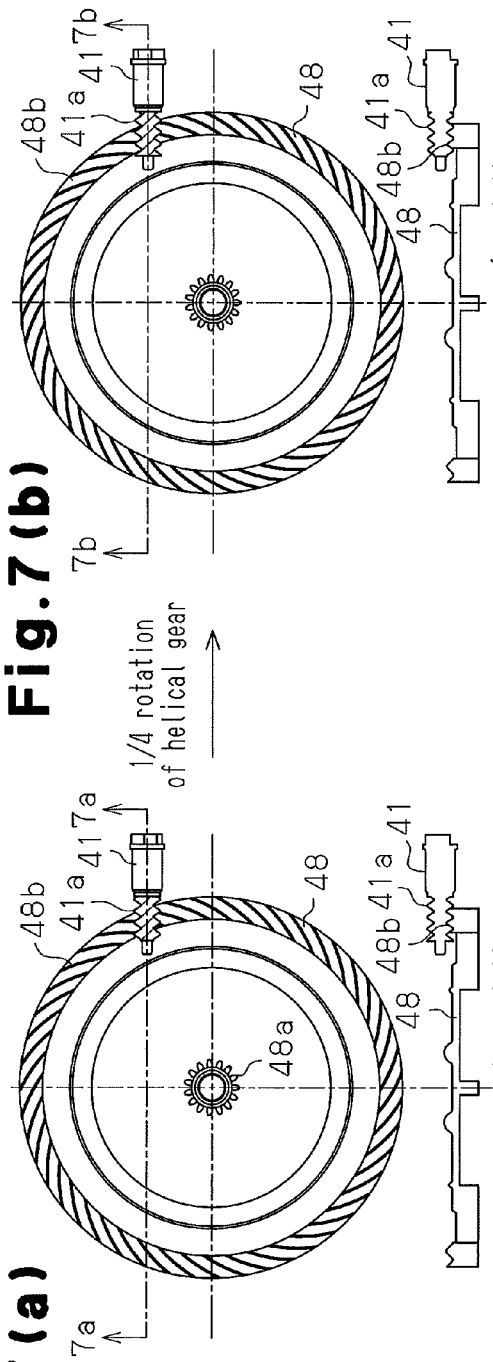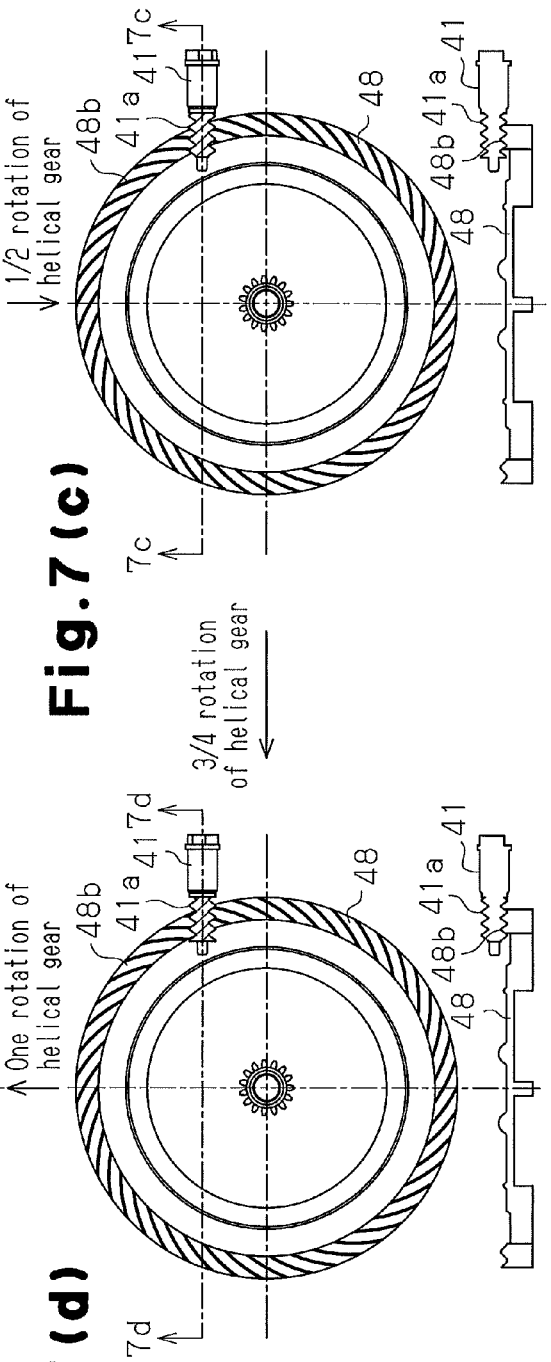

Fig.10

| | spur wheel | worm gear | embodiment |
|---|---|---|---|
| type of gear | roll | slide | Roll |
| meshing state | linear contact | point contact | linear contact |
| gear efficiency | ○ 85 to 95% | × 35 to 70% | ○ 80 to 85% |
| reverse rotation | possible | hard to rotate from output shaft | possible |
| operational noise | × easily occur | ○ less likely to occur | ○ less likely to occur |
| assembly influence | × Easily influenced by misalignment | ○ Less likely to be influenced by misalignment (adjustment unnecessary) | ○ Less likely to be influenced by misalignment (adjustment unnecessary) |
| influence of shift in gear meshing | × influence present (occurrence of noise, lowering of torque transmission) | × influence present (occurrence of noise, lowering of torque transmission) | ○ small influence |
| reduction ratio | arbitrary within tooth profile satisfying range | to 70 about 80 | to about 25 |

VEHICLE DOOR DRIVING DEVICE

FIELD OF THE INVENTION

The present invention relates to a vehicle door driving device for driving a door of a vehicle to open and close.

BACKGROUND OF THE INVENTION

Various vehicle door driving devices have been conventionally proposed. In the vehicle door driving device described in Patent Document 1, a guide rail is fixed to a body of a vehicle. The door of the vehicle is supported to be movable with respect to the body by way of the guide rail. The vehicle door driving device includes a driving mechanism, which is fixed to the door, and a cable, which is selectively reeled in and out by the driving mechanism. The ends of the cable are coupled to a front end and a rear end, respectively, of the guide rail at the body of the vehicle. Thus, the door opens and closes when the cable is selectively reeled in and out by the driving mechanism.

Patent Document 2 describes a driving mechanism that can be applied to the vehicle door driving device described above. The driving mechanism described in the document adopts a planetary gear train for a speed reducing mechanism. The planetary gear train includes a sun gear serving as a driving shaft, a ring gear serving as a driven shaft, and a carrier serving as a fixed shaft. The sun gear is directly coupled to a rotary shaft of a motor. The ring gear is coupled to a drum to rotate with the drum. The rotation of the motor is decelerated by the planetary gear train, and then transmitted to the drum. The speed reducing mechanism is configured such that each gear is arranged coaxially with the rotary shaft of the motor. A projected area in an axial direction of the driving mechanism is thus reduced.

Patent Document 3 describes another driving mechanism that can be applied to the vehicle door driving device described above. This driving mechanism described in the document adopts a worm gear, which has high reduction ratio, for the speed reducing mechanism. The driving mechanism described in the document includes an electromagnetic clutch that connects/shields the rotation transmitted from the motor to the drum through the speed reducing mechanism. The outer diameter of the drum is set based on a reeling speed, necessary torque, and the like with respect to the output characteristics of the motor. The outer diameter of the electromagnetic clutch is set to be smaller than the outer diameter of the drum. In this case, the dimension in the axial direction of the electromagnetic clutch becomes larger by reducing the outer diameter of the electromagnetic clutch. However, the enlargement of the electromagnetic clutch is suppressed by accommodating the electromagnetic clutch in the drum and effectively utilizing the space in the drum.

In the driving mechanism of Patent Document 2, the dimension in the axial direction of the driving mechanism is large because the motor and the speed reducing mechanism are stacked in the axial direction thereof. Thus, it is difficult to mount the driving mechanism on the door of the vehicle where space is restricted.

In the driving mechanism of Patent Document 3, the worm gear that decelerates at an axial portion of the motor is adopted. The space around the rotary shaft of the motor thus cannot be effectively utilized. In this case, the dimension in the axial direction of the driving mechanism becomes large because an output shaft (worm wheel) of the worm gear, the drum, and the electromagnetic clutch are stacked in the axial direction thereof. A large motor needs to be used to obtain the desired torque because the worm gear, which has low transmission efficiency, is adopted for the speed reducing mechanism.

PRIOR ART DOCUMENTS

Patent Documents

Patent Document 1: Japanese Laid-Open Patent Publication No. 2003-82927
Patent Document 2: Japanese National Phase Laid-Open Patent Publication No. 2009-523983
Patent Document 3: Japanese Laid-Open Patent Publication No. 2008-63762

SUMMARY OF THE INVENTION

It is an objective of the present invention to provide a vehicle door driving device that can be easily arranged in the vehicle by being thinned and that can sufficiently decelerate the rotation of the motor.

To achieve the foregoing objective and in accordance with a first aspect of the present invention, a vehicle door driving device is provide that includes a driving mechanism, which is fixed to a vehicle body or to a vehicle door and includes a motor and an output member rotated by the motor. The vehicle door driving device is configured to open and close the vehicle door by rotating the output member. The output member is arranged to have at least a part thereof accommodated in a space corresponding to an external shape of the motor. The space is a space corresponding to a dimension in a radial direction of the motor. The driving mechanism includes a pinion arranged on a rotary shaft of the motor and including a thread portion, a transmission gear, a ring gear, and a carrier. The transmission gear is arranged at a skew position with respect to the rotary shaft of the motor and has an axis extending in the radial direction. The transmission gear is freely rotational about an axis of the transmission gear and includes a disk gear portion having a plurality of teeth and a sun gear. The disk gear portion is arranged to be annular on a surface facing the pinion of the transmission gear and capable of being meshed with and rolling relative to the thread portion of the pinion. The sun gear is arranged on the same side as the pinion with respect to the disk gear portion. The ring gear is coaxial with the transmission gear and arranged on an outer peripheral side of the sun gear, the ring gear forming a fixed shaft. The carrier is coupled to the output member to rotate with the output member and includes a planet gear meshed with both the sun gear portion and the ring gear.

According to such a configuration, the rotation of the motor is transmitted to the transmission gear after being decelerated by the pinion and the disk gear portion. The planetary gear train is configured by the transmission gear (sun gear portion), the carrier (planet gear), and the ring gear. The rotation of the transmission gear (disk gear portion) is reduced at the reduction ratio at the time when the transmission gear (sun gear portion) is the driving shaft, the carrier that rotates with the output member is the driven shaft, and the ring gear is the fixed shaft, and then transmitted to the output member. The rotation of the motor is transmitted to the output member after being sufficiently decelerated through the pinion and the disk gear portion, and the planetary gear train. In this case, the transmission efficiency in the rotating direction of the pinion, the disk gear portion, and the planetary gear train is large compared to the transmission efficiency in the rotating direction of the worm gear in which the tooth surfaces make a slideable contact in speed reduction. The necessary torque thus is obtained even with a more compact motor.

The speed reduction between the pinion and the disk gear portion is carried out at a position offset in the axial direction of the transmission gear with respect to the rotary shaft of the motor. The sun gear portion (planetary gear train) is arranged on the same side as the pinion with respect to the disk gear portion in the axial direction of the transmission gear. That is, the sun gear portion is arranged in the space corresponding to the external shape of the motor, that is, the space corresponding to the dimension in the radial direction of the motor. By this arrangement, the dimension in the axial direction of the transmission gear thus can be suppressed small. In particular, with the arrangement of the planetary gear train about the axis of the transmission gear excluding the disk gear portion that meshes with the pinion, the desired reduction ratio can be ensured while suppressing the enlargement about the axis of the transmission gear. Therefore, the motor can be miniaturized. The driving mechanism can be easily arranged in the vehicle since the output member is efficiently arranged in a limited space.

In the above described vehicle door driving device, it is preferable that the output member be arranged coaxially with the ring gear, and that, in the ring gear, the ring gear be accommodated with at least a part in the axial direction overlapped with the output member.

According to such a configuration, the ring gear is accommodated in the output member while having at least a part in the axial direction thereof overlap with the output member. According to such an arrangement, the thickness of the driving mechanism can be reduced compared to when the output member and the ring gear are arranged stacked in the axial direction.

The above described vehicle door driving device preferably includes a switching means for switching to a state in which the rotation of the ring gear be restricted or a state in which the rotation of the ring gear is permitted, and a cancel mechanism for canceling the state in which the rotation of the ring gear is restricted by the switching means. The switching means is arranged such that at least a part of the switching means is accommodated in the space corresponding to the dimension in the radial direction of the motor. When the rotation of the ring gear is restricted by the switching means, the cancel mechanism cancels the state in which the rotation of the ring gear is restricted by a load that is transmitted to the ring gear through the output member and the carrier with the opening and closing of the vehicle door and exceeds a predetermined value.

According to such a configuration, when manually opening and closing the door of the vehicle, the output member (carrier) can be rotated while allowing the ring gear to freewheel by permitting the rotation of the ring gear by the switching means. The door thus can be opened and closed with a very small operation force by separating the rotational torque from the output member and the driving torque from the rotary shaft of the motor by the switching means. In particular, the switching means is efficiently arranged so that at least a part is contained in the space corresponding to the dimension in the radial direction of the motor. The thickness of the driving mechanism is thus reduced.

On the other hand, even if the rotation of the ring gear is restricted by the switching means, the state in which the rotation of the ring gear is restricted can be canceled by the cancel mechanism if the load exceeding the predetermined value is transmitted to the ring gear through the output member and the carrier with the opening/closing of the slide door. Therefore, an excessively large load is avoided from being applied to the ring gear or the switching means.

In the above described vehicle door driving device, it is preferable that the driving mechanism include a case that accommodates at least the output member, the transmission gear, the ring gear, and the carrier, a rolling member be rotationally supported by the case, and the rolling member rotationally make contact with a surface of the transmission gear on a side opposite to the pinion.

According to such a configuration, the transmission gear can be prevented from bending in the axial direction thereof by the rolling member. Thus, a contacting portion of the thread portion and the disk gear portion, that is, the meshing portion of the disk gear portion and the pinion is prevented from bending in the axial direction. Thus, the degradation of the gear efficiency between the pinion and the disk gear portion is prevented.

In the above described vehicle door driving device, the rolling member be arranged at least at a position corresponding to a meshing portion of the disk gear portion with the pinion.

According to such a configuration, the contacting portion of the pinion and the disk gear portion, that is, the meshing portion of the disk gear portion and the pinion can be further prevented from bending in the axial direction by arranging the rolling member on the opposite side of the meshing portion. Thus, the degradation of the gear efficiency between the pinion and the disk gear portion is further prevented.

In the above described vehicle door driving device, it is preferable that the case include a plurality of roller supporting portions at an outer peripheral edge of a portion having a disk shape, and the rolling member be a needle roller rotationally supported by the roller supporting portion.

In the above described vehicle door driving device, it is preferable that a part of the roller supporting portion to which the needle roller be fitted is formed into an undercut shape, and the needle roller rotationally make contact with a surface of the transmission gear that faces the case.

In the above described vehicle door driving device, it is preferable that the roller supporting portion include a spring body that urges the needle roller toward the transmission gear.

In the above described vehicle door driving device, it is preferable that a plurality of roller supporting portions be formed on an outer peripheral edge of the case, and the rolling member be a spherical body rotationally supported by the roller supporting portion.

In the above described vehicle door driving device, it is preferable that the roller supporting portion include a spring body that urges the spherical body toward the transmission gear.

In the above described vehicle door driving device, it is preferable that either the thread portion of the pinion or the disk gear portion be made of plastic, and the other one of the thread portion of the pinion or the disk gear portion be made of metal.

In the above described vehicle door driving device, it is preferable that the vehicle door driving device open and close the vehicle door by reeling in and reeling out rope members provided on the output member as the output member rotates. The vehicle door driving device preferably further includes a pulley mechanism around which a rope member to be reeled in by the output member and a rope member to be reeled out by the output member are respectively wound, the pulley mechanism guiding the rope members. It is preferable that the driving mechanism include a case that accommodates the output member, the transmission gear, the ring gear, the carrier, the switching means, the cancel mechanism, and the pulley mechanism.

According to such a configuration, the driving mechanism is unitized by accommodating the output member, the transmission gear, the carrier, the switching means, the cancel mechanism, and the pulley mechanism in the case. Thus, the driving mechanism can easily be assembled into a vehicle.

In the above described vehicle door driving device, it is preferable that the switching means include an engagement portion formed on an outer peripheral surface of the ring gear, an engaging/disengaging member arranged to be movable in a radial direction of the ring gear to engage with the engagement portion to restrict the rotation of the ring gear, a rotational input member coupled to the engaging/disengaging member, and an urging means. The input member is rotated to engage the engaging/disengaging member with the engagement portion or disengage the engagement of the engaging/disengaging member and the engagement portion from each other. The urging means urges the input member to a rotation position where the engaging/disengaging member and the engagement portion are engaged with each other.

According to such a configuration, the engaging/disengaging member engages with the engagement portion and disengages with the engagement portion by linearly moving along the radial direction of the ring gear. In this case, the engaging/disengaging member can be linearly moved by converting the rotational movement of the input member coupled to the engaging/disengaging member. That is, the movement of the engaging/disengaging member as described above can be realized with an extremely simple structure. When the input member is released, the input member is urged by the urging means and rotates, and is held at a rotation position where the engaging/disengaging member and the engagement portion are engaged.

BRIEF DESCRIPTION OF THE DRAWINGS

FIGS. 7(a) to 7(d) are explanatory views showing operation of the skew axis gear;

FIG. 10 is a table showing characteristics of a spur gear, a worm gear, and the skew axis gear;

DETAILED DESCRIPTION OF THE PREFERRED EMBODIMENTS

A vehicle door driving device according to one embodiment of the present invention will be hereinafter described with reference to FIGS. 1 to 10. Upon describing the vehicle door driving device, description will be made as below with front side, rear side, inner side, and outer side defined as shown in FIGS. 1 and 2.

Figure 1:
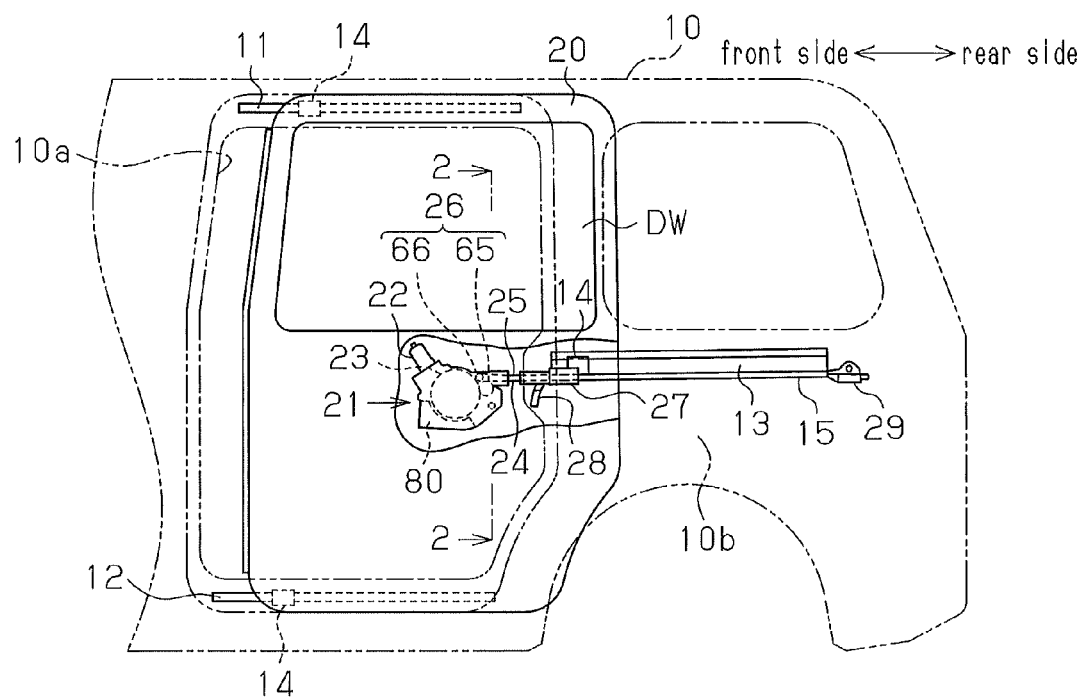
FIG. 1 is a schematic diagram showing the vicinity of a slide door of a vehicle in which a vehicle door driving device of the present invention is installed.
Figure 2:
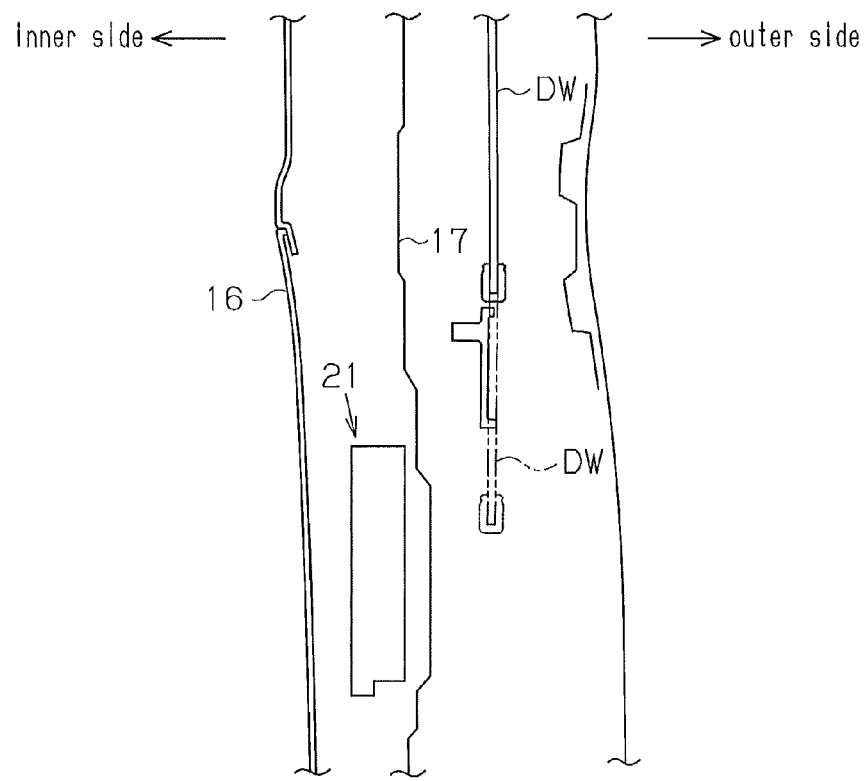
FIG. 2 is a cross-sectional view taken along line 2-2 of FIG. 1.

As shown in FIG. 1, a door opening 10a is formed at a side portion of a body 10 of a vehicle. An upper rail 11, which extends along an upper edge of the door opening 10a, and a lower rail 12, which extends along a lower edge of the door opening 10a, are fixed to the side portion of the body 10. A quarter panel 10b is positioned rearward of the door opening 10a of the body 10. A center rail 13, which extends in a front and rear direction, is fixed to the quarter panel 10b. A guide roller portion 14 is attached to each of the upper rail 11, the lower rail 12, and the center rail 13. A slide door 20 serving as a vehicle door is supported to be movable in the front and rear direction with respect to the upper rail 11, the lower rail 12, and the center rail 13 by way of the guide roller portion 14. The door opening 10a is opened and closed when the slide door 20 moves in the front and rear direction. The center rail 13 is arranged near a door belt line. A cable guide 15 is installed at the quarter panel 10b along the lower edge of the center rail 13. The cable guide 15 is attached over the entire length of the center rail 13.

A driving mechanism 21 is arranged inside the slide door 20. The driving mechanism 21 is arranged near the door belt line. The driving mechanism 21 is fixed to a rear part of the slide door 20 using bolts and nuts. Specifically, as shown in FIG. 2, the driving mechanism 21 is fixed to a door inner panel 17 while being sandwiched between a door trim 16, which configures a lining of the slide door 20, and the door inner panel 17, which configures a door inner plate. A door window glass DW that rises and lowers inside the slide door 20 is arranged on an outer side than the door inner panel 17. That is, the driving mechanism 21 is arranged to overlap with the door window glass DW but to not inhibit the rising/lowering of the door window glass DW.

As shown in FIG. 1, the driving mechanism 21 includes a driving motor 22, which is a brush motor, and a drum 23, which is an output member driven by the driving motor 22. A first cable 24 and a second cable 25 serving as rope members are wound around the drum 23. The first and second cables 24 and 25 are each wound around the drum 23 with one end locked to the drum 23. The first and second cables 24 and 25 are selectively reeled in and out by the driving mechanism 21. The driving mechanism 21 also includes an intermediate pulley 26 serving as a pulley mechanism. A guiding pulley 27 is coupled to the guide roller portion 14 that moves on the intermediate pulley 26 and the center rail 13. The first and second cables 24 and 25 are respectively bridged from the slide door 20 to the body 10 through the guiding pulley 27, and arranged along the cable guide 15. The intermediate pulley 26 and the guiding pulley 27 are respectively arranged rearward of the drum 23 and near the door belt line. The first cable 24 is guided by the cable guide 15 to extend forward. The other end of the first cable 24 is coupled to a tensioner 28 near a front end of the cable guide 15. The first cable 24 is fixed with respect to the body 10 by a bolt and a nut through the tensioner 28. The second cable 25 is guided by the cable guide 15 to extend towards the rear side. The other end of the second cable 25 is coupled to a tensioner 29 near a rear end of the cable guide 15. The second cable 25 is fixed with respect to the body 10 by a bolt and a nut through the tensioner 29.

According to such a configuration, when the second cable 25 is reeled in and the first cable 24 is reeled out by the driving mechanism 21, the slide door 20 moves rearward thus opening the door opening 10a. On the other hand, when the second cable 25 is reeled out and the first cable 24 is reeled in by the driving mechanism 21, the slide door 20 moves forward thus closing the door opening 10a.

The structure of the driving mechanism 21 will now be described with reference to FIGS. 3 to 5.

Figure 3:
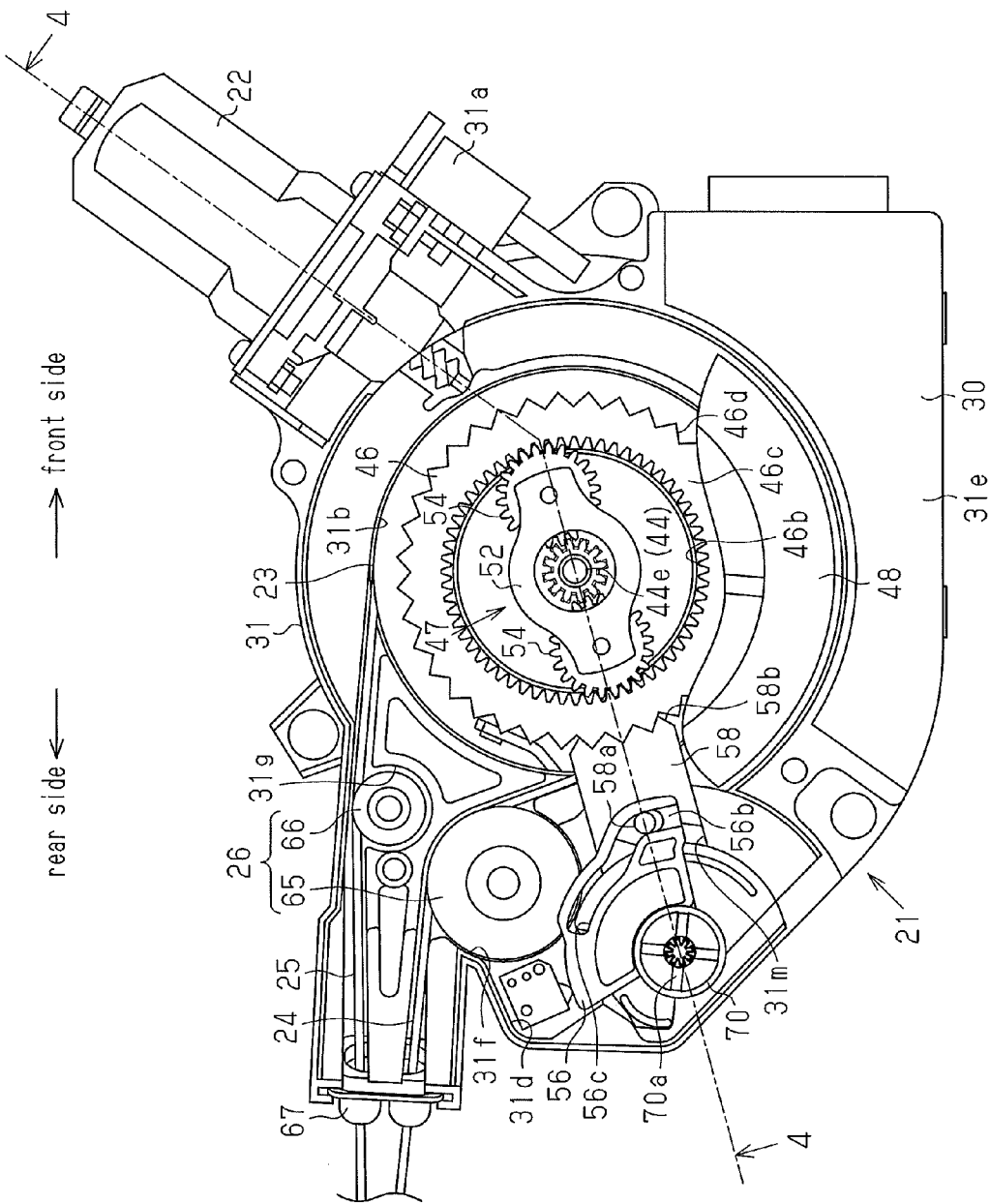
FIG. 3 is a front view of a driving mechanism as seen from inside.
Figure 4:
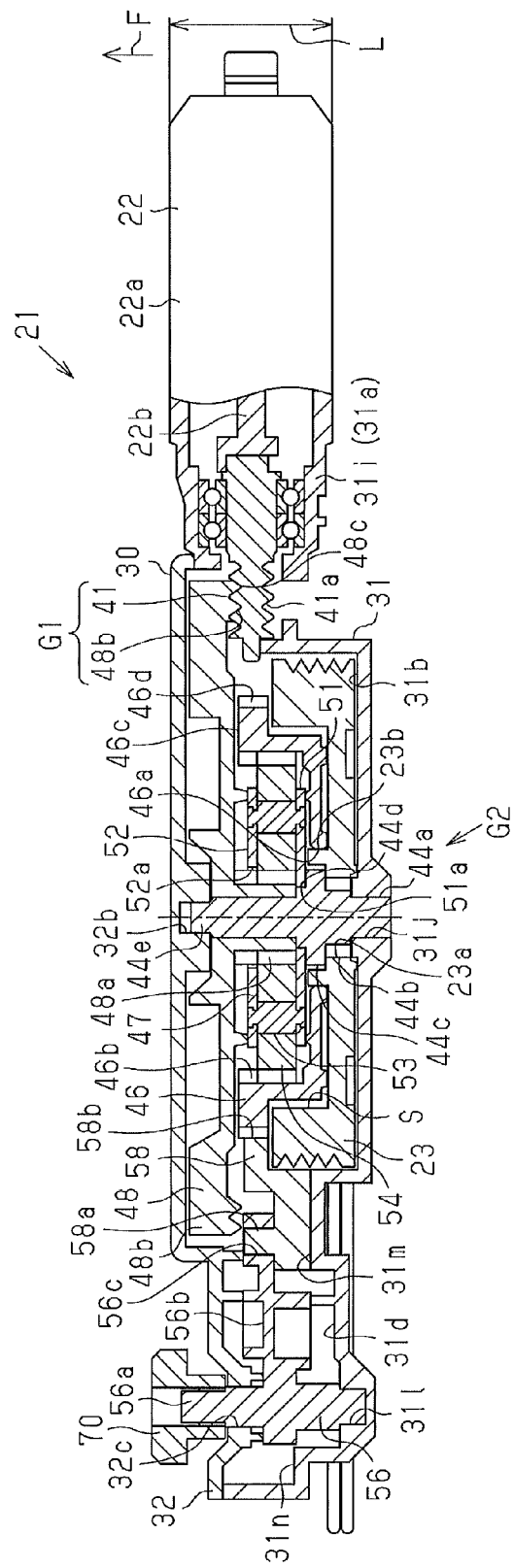
FIG. 4 is a cross-sectional view taken along line 4-4 of FIG. 3.
Figure 5:
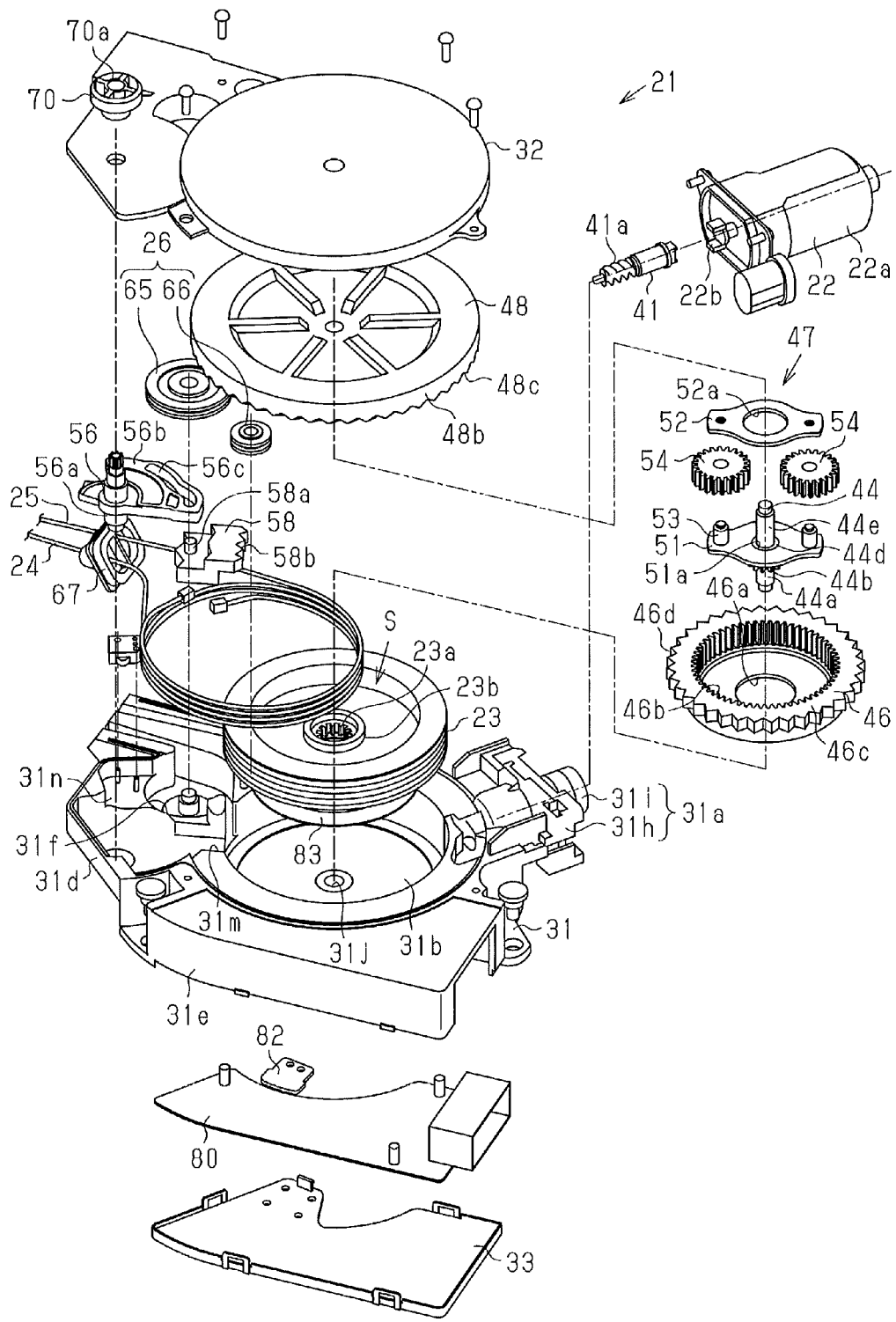
FIG. 5 is an exploded perspective view of the driving mechanism.

As shown in FIGS. 3 to 5, the driving mechanism 21 includes a box-shaped case 30. The case 30 includes a housing 31 for accommodating various components, a first cover 32, and a second cover 33. The first and second covers 32 and 33 are attached to the housing 31 to respectively block the openings provided on opposite sides of the housing 31. The driving device 21 is fixed and supported by the door inner panel 17 by fixing the housing 31 to the door inner panel 17. The housing 31, the first cover 32, and the second cover 33 are all formed by plastic molding.

The housing 31 includes a motor holder portion 31a, a gear accommodation portion 31b having a substantially cylindrical shape with a closed end, a lever accommodation portion 31d having a substantially sectorial tubular shape with a closed end, a substrate accommodation portion 31e having a tubular shape with a lid, and a pair of pulley accommodation portions 31f and 31g. The motor holder portion 31a is arranged at an upper end of a front edge of the housing 31. The gear accommodation portion 31b is adjacent to the lower rear side of the motor holder portion 31a. The lever accommodation portion 31d is adjacent to the rear side of the gear accommodation portion 31b. The substrate accommodation portion 31e is adjacent to the gear accommodation portion 31b and the lever accommodation portion 31d and is arranged on a lower side of the gear accommodation portion 31b. The pulley accommodation portions 31f and 31g are provided on the upper side of the lever accommodation portion 31d and are adjacent to the rear side of the gear accommodation portion 31b. The pulley accommodation portion 31f is arranged on the lower side of the pulley accommodation portion 31g. The gear accommodation portion 31b, the lever accommodation portion 31d, and the pulley accommodation portions 31f and 31g are opened on the inner side surface of the housing 31. The substrate accommodation portion 31e is opened on the outer side surface of the housing 31. The gear accommodation portion 31b and the lever accommodation portion 31d are formed into a cylindrical shape, and are connected by overlapping with a part thereof. The pulley accommodation portions 31f and 31g are respectively connected to the gear accommodation portion 31b.

As shown in FIG. 5, the motor holder portion 31a includes a holder main body 31h and a substantially cylindrical shaft inserting portion 31i. The driving motor 22 includes a substantially flat cylindrical stator 22a. The stator 22a is fastened to the holder main body 31h with a screw. The shaft inserting portion 31i passes through a central part of the holder main body 31h, and further passes through a peripheral wall of the gear accommodation portion 31b. The shaft inserting portion 31i communicates with a space on the inner side of the gear accommodation portion 31b. The shaft inserting portion 31i is opened in a direction offset from the center of the gear accommodation portion 31b. The shaft inserting portion 31i is opened in a direction substantially orthogonal to the axis of the gear accommodation portion 31b. An axis of the rotary shaft 22b of the driving motor 22 extends along the shaft inserting portion 31i. A pinion 41 that rotates with the rotary shaft 22b is inserted and supported at the shaft inserting portion 31i. As shown in FIG. 4, the housing 31 (case 30) is arranged in the slide door 20 that at least a part is accommodated in a space corresponding to the external shape of the stator 22a, that is, a space corresponding to a dimension L in a radial direction F of the rotary shaft 22b. The radial direction F coincides with a short side direction of the driving motor 22 (stator 22a). The space corresponding to the external shape of the stator 22a refers to a space formed between both side surfaces of the stator 22a separated by a distance L, that is, the entire space formed between a pair of planes orthogonal to the sheet of the drawing of FIG. 4. The pinion 41 includes a thread portion 41a having an even number, for example, two threads. The pinion 41 includes a so-called high deceleration helical gear in which the number of teeth is small.

A circular bearing hole 31j is formed at a center of a bottom wall of the gear accommodation portion 31b. A supporting shaft 44 is supported in a freely rotating manner in the bearing hole 31j. The supporting shaft 44 is formed into a substantially columnar shape with a step concentric with the bearing hole 31j. The supporting shaft 44 includes a substantially columnar shaped shaft portion 44a supported in the bearing hole 31j and a serration 44b. The serration 44b is adjacent in a direction (upper side of FIG. 4) of separating away from the bearing hole 31j with respect to the shaft portion 44a. The supporting shaft 44 includes a diameter enlarged portion 44c, a substantially circular fit-in portion 44d, and a substantially columnar shaped shaft portion 44e. The diameter enlarged portion 44c is adjacent in a direction (upper side) of separating away from the bearing hole 31j with respect to the serration 44b. The fit-in portion 44d is adjacent on the upper side with respect to the diameter enlarged portion 44c. The shaft portion 44e is adjacent on the upper side with respect to the fit-in portion 44d. The supporting shaft 44 supported in the bearing hole 31j is arranged at a skew position with respect to the rotary shaft 22b of the driving motor 22. An axis of the supporting shaft 44 is parallel to the radial direction F of the rotary shaft 22b, that is, a direction orthogonal to the sheet of the drawing of FIG. 3.

The drum 23 is coupled to the supporting shaft 44. The drum 23 rotates with the supporting shaft 44. The drum 23 is formed into a substantially cylindrical shape that has a closed end and opens towards the first cover 32. A serration 23a that passes through the drum 23 is formed at the center of the bottom wall of the drum 23. The serration 44b of the supporting shaft 44 engages the serration 23a of the drum 23. A substantially cylindrical boss portion 23b is formed at the center of the bottom wall of the drum 23. An inner diameter of the boss portion 23b is equal to the outer diameter of the diameter enlarged portion 44c. A circular accommodation space S is formed on the inner peripheral side of the drum 23.

The ring gear 46 is supported in a freely rotating manner at the drum 23. The ring gear 46 has a substantially cylindrical shape, which has a bottom and is concentric with the drum 23. A circular bearing hole 46a for supporting the boss portion 23b is formed at the center of the bottom wall of the ring gear

46. The inner diameter of the bearing hole 46*a* is equal to the outer diameter of the boss portion 23*b*. The ring gear 46 has a circular tube portion having an outer diameter smaller than the inner diameter of the drum 23. The tube portion of the ring gear 46 is accommodated in the accommodation space S of the drum 23. The ring gear 46 includes internal teeth 46*b* provided on the inner peripheral surface of the tube portion, and a large wheel gear 46*c* serving as an engagement portion having an annular shape. The large wheel gear 46*c* is formed to spread radially outward from a distal end of the tube portion projecting out from the accommodation space S and to cover the opening end face of the drum 23. A plurality of lock teeth 46*d* are formed at equiangular interval on an outer peripheral surface of the large wheel gear 46*c*. Each lock tooth 46*d* is formed into a substantially right triangle.

The carrier 47 is coupled to the supporting shaft 44 to rotate with the supporting shaft 44 assembled with the ring gear 46, and the like. As shown in FIG. 5, the carrier 47 includes a pair of plates 51 and 52 arranged side by side in the axial direction of the supporting shaft 44, and a pair of planet gears 54. Each planet gear 54 is sandwiched between the ends of the plates 51 and 52, and is supported in a freely rotating manner about the shaft 53. A substantially circular fit-in hole 51*a* to be fitted with the fit-in portion 44*d* of the supporting shaft 44 is formed at the center of one plate 51 of the plates 51 and 52. A circular insertion hole 52*a*, to which the shaft portion 44*e* is movably inserted, is formed at the center of the other plate 52. Both of the planet gears 54 are accommodated in the ring gear 46 while being meshed with the internal teeth 46*b* of the ring gear 46. Both of the planet gears 54 orbit around the axis of the ring gear 46 while spinning. Thus, the plates 51 and 52 configuring the carrier 47 can rotate with respect to the ring gear 46 with the drum 23 and the supporting shaft 44.

The transmission gear 48 is supported in a freely rotating manner with respect to the supporting shaft 44 assembled with the carrier 47, and the like. The transmission gear 48 has an axis that is arranged at a skew position with respect to the rotary shaft 22*b* of the driving motor 22 and that is parallel to the radial direction F. The transmission gear 48 includes a sun gear portion 48*a* and a disk gear portion 48*b*. The sun gear portion 48*a* is movably inserted to the insertion hole 52*a* to support the shaft portion 44*e* and is meshed with the planet gears 54. The disk gear portion 48*b* is formed to spread outward from the distal end of the sun gear portion 48*a* projecting out from the insertion hole 52*a* and to cover the opening end of the gear accommodation portion 31*b*. The sun gear portion 48*a* is arranged on the same side as the pinion 41 with respect to the disk gear portion 48*b*. The transmission gear 48 (sun gear portion 48*a*) configures a planetary gear train G2 with the ring gear 46 and the carrier 47. A plurality of teeth 48*c* is formed on the outer peripheral edge of the disk gear portion 48*b*. The teeth 48*c* are formed into an annular shape on a rear surface (lower surface of FIG. 4) of the disk gear portion 48*b* opposing the pinion 41. The pinion 41 is arranged offset in a thickness direction with respect to the disk gear portion 48*b*. The disk gear portion 48*b* configures a skew axis gear G1 with the pinion 41.

Figure 6:
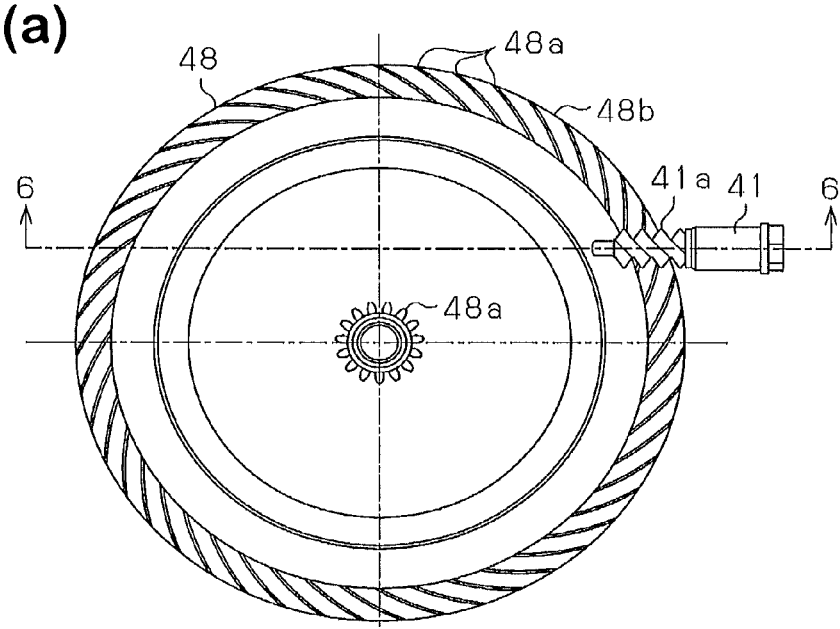
FIGS. 6(a), 6(b), and 6(c) illustrate a plan view, a cross-sectional view, and a perspective view, respectively, showing a skew axis gear.
Figure 6:
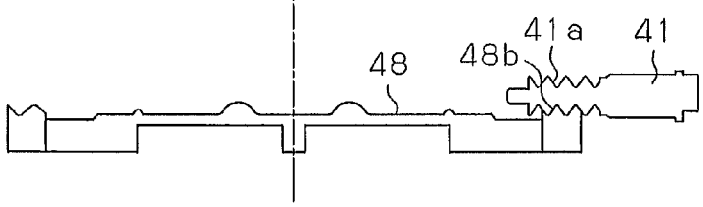
Figure 6:
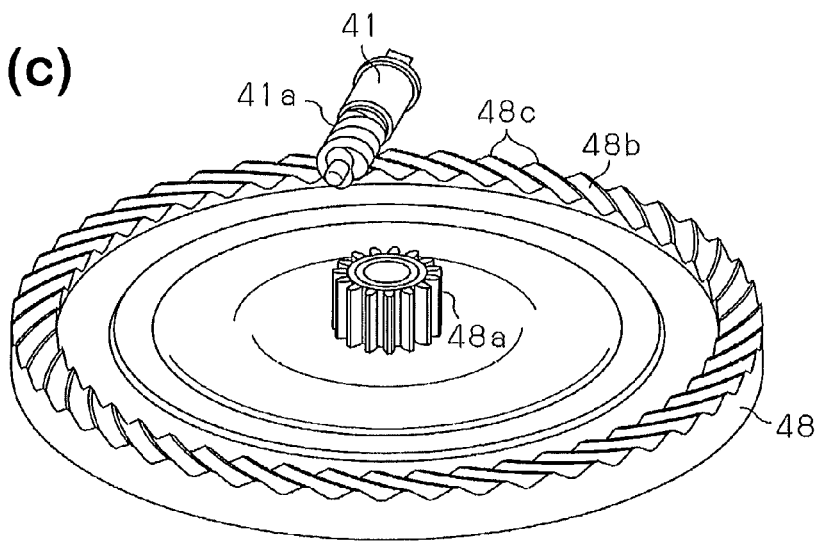
Figure 8:
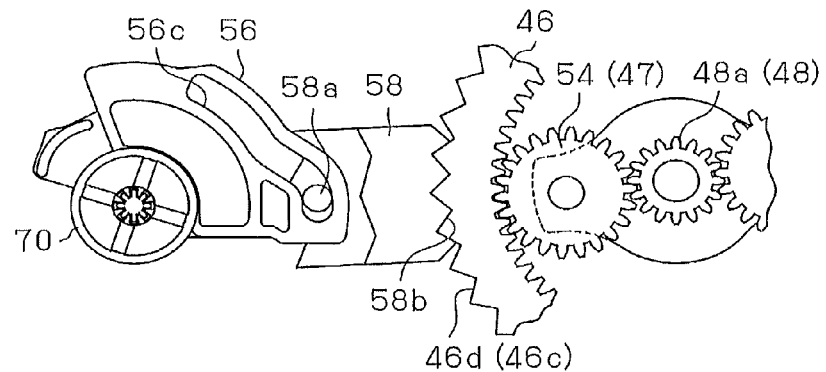
FIG. 8(a) is a schematic diagram showing a state in which a switching lever is arranged at an electric switching position.
FIG. 8(b) is a schematic diagram showing a state in which the switching lever is arranged at a manual switching position.
Figure 8:
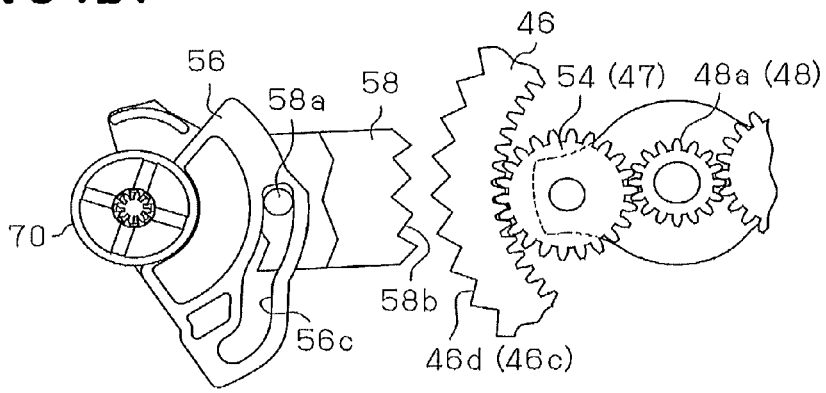
Figure 9:
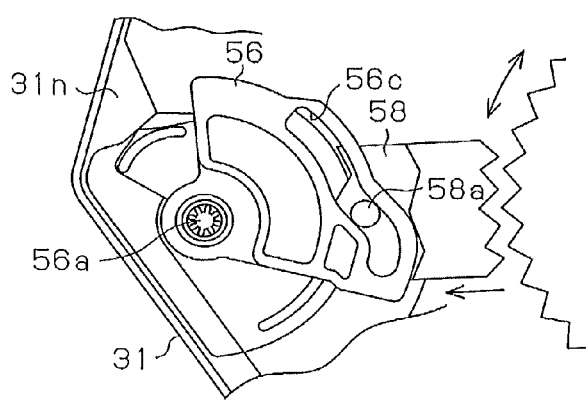
FIGS. 9(a) and 9(b) are schematic diagram diagrams showing a state in which an engaging/disengaging block and a ring gear are disengaged.
Figure 9:
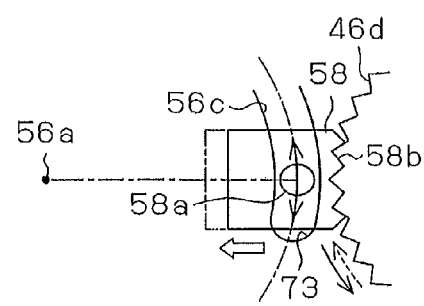

As shown in FIGS. 6(*a*), 6(*b*), and 6(*c*), the teeth 48*c* are skew to mesh with the thread portion 41*a* of the pinion 41 while making a rolling contact (linear contact). Generally, in a relationship between the face gear and the pinion orthogonal to the tooth surface thereof, an outer peripheral length of the gear tooth of the face gear is greater than an inner peripheral length. That is, when the face gear is rotated using a normal pinion, galling occurs between the face gear and the pinion due to the difference between the outer peripheral length and the inner peripheral length of the gear tooth, so that high accuracy cannot be obtained. However, according to the present embodiment, the teeth 48*c* of the disk gear portion 48*b* mesh with the thread portion 41*a* while making a rolling contact with the thread portion 41*a* with the rotation of the pinion 41.

FIG. 7 shows transmission of rotation from the pinion 41 to the disk gear portion 48*b* (transmission gear 48). FIGS. 7(*a*) to 7(*d*) sequentially show the transition of when the pinion 41 makes a ¼ rotation from an arbitrary initial state (FIG. 7(*a*)) in a clockwise direction. As shown in each figure, the initial state is the same as the state (FIG. 7(*c*)) of when making ½ rotation from the initial state for the meshed state of the pinion 41 and the disk gear portion 48*b*. Furthermore, the state (FIG. 7(*b*)) of when making ¼ rotation from the initial state is the same as the state (FIG. 7(*d*)) of when making ¾ rotation from the initial state for the meshed state of the pinion 41 and the disk gear portion 48*b*. Thus, the rotation is transmitted between the pinion 41 and the disk gear portion 48*b* (transmission gear 48) by feeding the teeth 48*c* with the rotation of the pinion 41.

FIG. 10 shows the characteristics of the skew axis gear G1 of the present embodiment with the characteristics of a spur gear and a worm gear configuring speed reducing mechanisms. As shown in FIG. 10, the skew axis gear G1 more or less has advantages of both the spur gear and the worm gear. The skew axis gear G1 does not have the reduction ratio of the worm gear but has an excellent performance on the gear efficiency, operational noise, assembly influence, and influence of gear meshing.

According to such a configuration, the rotation of the pinion 41 is reduced according to the ratio of the number of threads of the thread portions 41*a* and the number of teeth of the disk gear portions 48*b*, and then transmitted to the transmission gear 48. For instance, if the transmission gear 48 is rotated with the rotation of the ring gear 46 locked, the rotation of the transmission gear 48 is reduced at the reduction ratio at the time when the sun gear portion 48*a* is the driving shaft, the carrier 47 is the driven shaft, and the ring gear 46 is the fixed shaft, and then transmitted to the drum 23. That is, the rotation of the driving motor 22 (rotary shaft 22*b*) is sufficiently reduced through the pinion 41 and the disk gear portion 48*b* (skew axis gear G1), and the planetary gear train G2, and then transmitted to the drum 23. When the drum 23 is rotated, the slide door 20 opens and closes in accordance with the rotation direction of the drum 23.

As shown in FIG. 4, the lever accommodation portion 31*d* has a sectorial bottom wall. A circular bearing hole 31*l* is formed at the center of the bottom wall. The lever accommodation portion 31*d* includes a substantially square groove-shaped guide groove 31*m* and a seating portion 31*n*. The guide groove 31*m* extends along a line connecting the bearing hole 31*l* and the bearing hole 31*j*, and is connected to the gear accommodation portion 31*b*. The seating portion 31*n* is raised towards the opening of the lever accommodation portion 31*d* on a side opposite to the guide groove 31*m* with respect to the bearing hole 31*l*. A switching lever 56 is supported in a freely rotating manner in the bearing hole 31*l*. The switching lever 56 includes a substantially columnar shaped shaft portion 56*a* with a step that is concentric with the bearing hole 31*l*. A distal end of the shaft portion 56*a* is supported in the bearing hole 31*l*.

The switching lever 56 further includes a sectorial lever portion 56*b* that spreads from the shaft portion 56*a* toward the large wheel gear 46*c*. The lever portion 56*b* is arranged near the large wheel gear 46*c*. The lever portion 56*b* is formed with a long hole shaped cam hole 56*c*, which extends along the outer side edge of the lever portion 56*b*. The cam 56*c* has a curved shape in which a left end shown in FIG. 3 is brought proximate to the shaft portion 56a than the right end. The switching lever 56 further includes a return spring (not shown) serving as an urging means. One end of the return spring is locked to the lever accommodation portion 31d, and the other end is locked to the switching lever 56. The return spring is urged to turn the switching lever 56 in a counterclockwise direction shown in FIG. 3 and hold it at an electric switching position Pa.

A plate-shaped engaging/disengaging block 58 serving as an engaging/disengaging member is arranged in the guide groove 31m. The engaging/disengaging block 58 can move along the guide groove 31m. The engaging/disengaging block 58 includes an engagement pin 58a to be inserted to the cam hole 56c. The engagement pin 58a extends perpendicular to the sheet of the drawing and toward the view of FIG. 3. The engaging/disengaging block 58 includes a plurality of gear side lock teeth 58b. Each gear side lock tooth 58b is raised toward the large wheel gear 46c from the distal end of the engaging/disengaging block 58. A plurality of lock teeth 46d approaching the guide groove 31m are formed in the large wheel gear 46c. The gear side lock teeth 58b can mesh with the lock teeth 46d of the large wheel gear 46c. Each gear side lock tooth 58b is formed into a substantially right triangle.

As shown in FIG. 8(a), in a state in which the switching lever 56 is arranged at the electric switching position Pa, the engagement pin 58a of the engaging/disengaging block 58 is arranged at the right end of the cam hole 56c. In this case, the engagement pin 58a is pushed out toward the gear accommodation portion 31b by the inner wall surface of the cam hole 56c, so that the gear side lock teeth 58b mesh with the lock teeth 46d of the ring gear 46. The ring gear 46 thus becomes non-rotational.

In contrast, as shown in FIG. 8(b), in a state in which the switching lever 56 is turned in the clockwise direction and arranged at a manual switching position Pm, the engagement pin 58a of the engaging/disengaging block 58 is arranged at the left end of the cam hole 56c. In this case, the engagement pin 58a is pulled rear toward the shaft portion 56a by the inner wall surface of the cam hole 56c, so that the meshing of the gear side lock teeth 58b with the lock teeth 46d of the ring gear 46 is cancelled. The ring gear 46 thus becomes rotational.

As shown in FIGS. 1 and 3, a pulley 65 is supported in a freely rotating manner in the pulley accommodation portion 31f. A pulley 66 having an outer diameter different from that of the pulley 65 is supported in a freely rotating manner in the pulley accommodation portion 31g. The pulleys 65 and 66 configure the intermediate pulley 26. The cables 24 and 25 reed in and reeled out from the drum 23 are respectively guided by the pulleys 65 and 66, and brought to the guiding pulley 27 through a dust proof cable grommet 67.

As shown in FIG. 4, the first cover 32 is attached to the housing 31 accommodating the transmission gear 48, and the like. The first cover 32 closes the gear accommodation portion 31b, the lever accommodation portion 31d, and both pulley accommodation portions 31f and 31g. The first cover 32 supports the supporting shaft 44, the switching lever 56, and the like in a freely rotating manner. The first cover 32 includes a substantially cylindrical bearing portion 32b. The bearing portion 32b is concentric with the shaft portion 44e and projects out from a lid wall of the first cover 32. The shaft portion 44e is supported by the bearing portion 32b. The first cover 32 includes a substantially circular bearing hole 32c. The bearing hole 32c is concentric with the shaft portion 56a and is formed in the lid wall of the first cover 32. The shaft portion 56a is passed through and supported by the bearing hole 32c.

A substantially button-shaped switching knob 70 is fixed to a distal end of the shaft portion 56a. The switching knob 70 is arranged to expose the distal end face from the door trim 16 when the slide door 20 is closed. A substantially cross-shaped key groove 70a is formed at the distal end face of the switching knob 70. When the operation force is transmitted from a passenger compartment through the switching knob 70, the position of the switching lever 56 is switched to the electric switching position Pa or the manual switching position Pm. The switching knob 70 configures the engaging/disengaging means with the switching lever 56, the engaging/disengaging block 58, the return spring, and the like.

The transmission gear 48 and the like accommodated in the housing 31 are also arranged in the slide door 20 so that at least a part is accommodated in the space corresponding to the external shape of the stator 22a, that is, the space corresponding to the dimension L in the radial direction F shown in FIG. 4. In particular, the drum 23, the ring gear 46, the carrier 47, and the transmission gear 48 are arranged so that at least a part is accommodated in the space formed by projecting the external shape of the stator 22a in the axial direction.

As shown in FIG. 5, the substrate accommodation portion 31e accommodates an ECU (Electronic Control Unit) substrate 80. The ECU substrate 80 is formed in accordance with the external shape of the second cover 33. An ECU (not shown), which is configured with a microcomputer as a main body, a rotation sensor 82 including a magnetic detection sensor with a Hall element, and the like are mounted on the ECU substrate 80. The rotation sensor 82 detects the rotating position, the rotation speed, and the like of the drum 23. The rotation sensor 82 is arranged with a predetermined spacing with respect to a ring shaped magnet rotor 83 fixed to the drum 23. A bus bar (not shown) is embedded in the housing 31. The bus bar is electrically connected to a power supply portion of the driving motor 22 held by the motor holder portion 31a, and the ECU substrate 80. The driving motor 22 and the ECU substrate 80 are electrically connected basically without interposing a wire harness. The ECU substrate 80 in the housing 31 is also arranged in the slide door 20 so that at least a part is accommodated in the space corresponding to the external shape of the stator 22a, that is, the space corresponding to the dimension L in the radial direction F.

Operation of a vehicle door driving device will now be described.

First, as shown in FIG. 8(a), the switching knob 70 is operated so that the switching lever 56 is arranged at the electric switching position Pa, and the ring gear 46 is made to be non-rotational by the engaging/disengaging block 58. In this case, the rotation of the driving motor 22 is subjected to the first deceleration by the pinion 41 and the disk gear portion 48b, and then transmitted to the transmission gear 48. The rotation of the transmission gear 48 (disk gear portion 48b) is subjected to the second deceleration at the reduction ratio at the time when the transmission gear 48 (sun gear portion 48a) serves as the driving shaft, the carrier 47 serves as the driven shaft, and the ring gear 46 serves as the fixed shaft in the planetary gear train G2, and then transmitted to the drum 23. Therefore, the rotation of the driving motor 22 is transmitted to the drum 23 after being sufficiently decelerated by the skew axis gear G1 and the planetary gear train G2.

Furthermore, when manually opening and closing the slide door 20 in this state, the rotation of the drum 23, which accompanies the opening and closing of the slide door 20, is efficiently transmitted in the planetary gear train G2 and the skew axis gear G1 even if the locked state of the ring gear 46 by the engaging/disengaging block 58 is maintained. Thus, the opening/closing operation of the slide door 20 can be carried out while rotating the driving motor (rotary shaft 22b), and the like with an operation force of a certain extent.

As shown in FIG. 8(b), when the switching knob 70 is operated so that the switching lever 56 is arranged at the manual switching position Pm, the engaging/disengaging block 58 and the ring gear 46 are disengaged. If the slide door 20 is manually opened and closed in this state, the drum 23 (carrier 47) can rotate while allowing the ring gear 46 to freewheel. Thus, the slide door 20 can be opened and closed by a very small operation force by separating the rotational torque from the drum 23 and the driving torque from the rotary shaft 22b of the driving motor 22 by the engaging/disengaging block 58, and the like.

When the switching lever 56 is arranged at the electric switching position Pa and the engaging/disengaging block 58 is engaged with the ring gear 46, a load (torque) that exceeds a predetermined level is sometimes applied to the engaging/disengaging block 58 from the ring gear 46. In such a case, the engaging/disengaging block 58 and the ring gear 46 are disengaged (cancel mechanism), as shown in FIGS. 9(a) and 9(b). In other words, an end of the cam hole 56c of the switching lever 56 includes an arcuate groove shape 73 having the shaft portion 56a as a center. The groove shape 73 is set to be arranged on both sides of the engagement pin 58a when the switching lever 56 is arranged at the electric switching position Pa.

When the gear side lock teeth 58b that mesh with the lock teeth 46d are pushed in the circumferential direction of the ring gear 46, a force in a direction of surmounting the meshing state of the lock teeth 46d and the gear side lock teeth 58b generates in the engaging/disengaging block 58. The engaging/disengaging block 58 thus swings to the left or the right and moves towards the shaft portion 56a while rotating the switching lever 56. The engaging/disengaging block 58 is then separated from the lock teeth 46d. Thus, although the ring gear 46 interferes with the tooth tops of the gear side lock teeth 58b, the rotation (freewheeling) of the ring gear 46 is permitted. Therefore, even if the engaging/disengaging block 58 is engaged with the ring gear 46, the engaging/disengaging block 58 and the ring gear 46 are disengaged and the rotation of the ring gear 46 is permitted when a load exceeding a predetermined value is transmitted between the ring gear 46 and the engaging/disengaging block 58. Therefore, at the time of an emergency in which the slide door 20 is to be quickly opened by hand during the closing activation by an electric operation, an excessively large load will not be applied between the ring gear 46 and the engaging/disengaging block (lock teeth 46d and gear side lock teeth 58b) even if the load (torque) exceeding the predetermined value is transmitted to the ring gear 46 through the drum 23 and the carrier 47.

The present embodiment has the following advantages.

(1) The rotation of the driving motor 22 is transmitted to the transmission gear 48 after being decelerated by the skew axis gear G1 including the pinion 41 and the disk gear portion 48b. The planetary gear train G2 is configured by the transmission gear 48 (sun gear portion 48a), the carrier (planet gear 54), and the ring gear 46. The rotation of the transmission gear 48 (disk gear portion 48b) is transmitted to the drum 23 after being decelerated at the reduction ratio at the time when the transmission gear 48 (sun gear portion 48a) serves as the driving shaft, the carrier 47 that rotates with the drum 23 serves as the driven shaft, and the ring gear 46 serves as the fixed shaft. The rotation of the driving motor 22 is thus transmitted to the drum 23 after being sufficiently decelerated through the planetary gear train G2 including the pinion 41 and the disk gear portion 48b. In this case, at deceleration, the transmission efficiency in the rotating direction of the pinion 41, the disk gear portion 48b, and the planetary gear train G2 is larger compared to the transmission efficiency in the rotating direction of the worm gear in which the tooth surfaces make a slideable contact. Thus, the necessary torque can be obtained even with a more compact motor.

The speed reduction between the pinion 41 and the disk gear portion 48b is carried out at a position offset in the axial direction of the transmission gear 48 with respect to the rotary shaft 22b of the driving motor 22. The sun gear portion 48a (planetary gear train G2) is arranged on the same side as the pinion 41 with respect to the disk gear portion 48b in the axial direction of the transmission gear 48. That is, the sun gear portion 48a is arranged in the space corresponding to the external shape of the driving motor 22, that is, the space corresponding to the dimension L in the radial direction F shown in FIG. 4. The dimension in the axial direction of the transmission gear 48 thus can be reduced and the thickness of the driving mechanism 21 can also be suppressed small. In particular, with the arrangement of the planetary gear train G2 about the axis of the transmission gear 48 excluding the disk gear portion 48b that meshes with the pinion 41, the desired reduction ratio can be ensured while suppressing the enlargement about the axis of the driving mechanism 21. Therefore, the driving motor 22 can be miniaturized. Furthermore, the driving mechanism 21 can be easily arranged in the vehicle since the drum 23 is efficiently arranged in a limited space.

(2) The ring gear 46 is accommodated in the drum 23 while having at least a part in the axial direction thereof overlapping with the drum 23. According to such an arrangement, the thickness of the driving mechanism 21 can be suppressed small compared to when the drum 23 and the ring gear 46 are arranged stacked in the axial direction.

(3) When manually opening and closing the slide door 20, the drum 23 (carrier 47) can be rotated while allowing the ring gear 46 to freewheel if the rotation of the ring gear 46 is permitted by the engaging/disengaging block 58. Thus, the slide door 20 can be opened and closed by a very small operation force by separating the rotational torque from the drum 23 and the driving torque from the rotary shaft 22b of the driving motor 22 by the engaging/disengaging block 58, and the like. In particular, the engaging/disengaging block 58 is efficiently arranged so that at least a part is contained in the space of distance L shown in FIG. 4. Thus, the thickness of the driving mechanism 21 can be suppressed small.

Even if the rotation of the ring gear 46 is restricted by the engaging/disengaging block 58, the state in which the rotation of the ring gear 46 is restricted by the engaging/disengaging block 58 can be canceled if the load (torque) exceeding the predetermined value is transmitted to the ring gear 46 through the drum 23 and the carrier 47 with the opening/closing of the slide door 20. Therefore, an excessively large load is avoided from being applied to the ring gear 46 or the engaging/disengaging block 58. In particular, the lock teeth 46d and the gear side lock teeth 58b have a symmetrical substantially right triangular shape. Thus, an excessively large load (torque) is avoided from being applied to the ring gear 46 or the engaging/disengaging block 58 regardless of the direction of the load transmitted in the ring gear 46, that is, the opening/closing direction and opening/closing position of the slide door 20

(4) The driving mechanism 21 is unitized by accommodating the drum 23, the ring gear 46, the carrier 47, the transmission gear 48, the switching lever 56 and the engaging/disengaging block 58 configuring the cancel mechanism, the intermediate pulley 26, the ECU substrate 80, and the like in the case 30. The driving mechanism 21 thus can be easily assembled to the slide door 20. Since various components such as the drum 23 are arranged in the case 30, the driving mechanism 21 can be miniaturized.

(5) The engaging/disengaging block 58 linearly moves in the radial direction of the ring gear 46 to engage with the large wheel gear 46c of the ring gear 46 or to disengage with the large wheel gear 46c. In this case, the engaging/disengaging block 58 can be linearly moved by converting the rotational movement of the switching lever 56 (and switching knob 70) coupled to the engaging/disengaging block 58. That is, the movement of the engaging/disengaging block 58 as described above can be realized with an extremely simple structure. When the switching knob 70 is released, the switching lever 56 is urged by the return spring and rotates, and is held at a position of engaging the engaging/disengaging block 58 and the large wheel gear 46c.

(6) The skew axis gear G1, which has strong endurance to misalignment, is adopted. In this case, the pinion 41 can be smoothly meshed with respect to the disk gear portion 48b by inserting the pinion 41 (rotary shaft 22b) to the shaft inserting portion 31i of the housing 31 accommodating the transmission gear 48. The gear activation sound thus reduces compared to the case of the spur wheel.

(7) The switching lever 56 can be switched to the electric switching position Pa or the manual switching position Pm with only a key (a coin and the lie) that can engage with the key groove 70a of the switching knob 70. Thus, an easy switching of the switching lever 56 by children is prevented.

(8) The electric or manual switching is carried out by the driving mechanism 21 (the switching knob 70 and the like) mounted on the slide door 20. Thus, the passenger can select either electric operation or manual operation for every slide door 20 by mounting the driving mechanism 21 on each of the slide doors 20. Therefore, the degree of freedom in the usage mode enhances compared to a configuration in which the selection of electric or manual of the slide door 20 can be made only with one main switch provided at the driver's seat. Furthermore, the electrical configuration can be simplified and the manufacturing cost can be reduced by omitting the main switch.

(9) Excluding the driving motor 22, various components such as the drum 23 are sequentially assembled to one opening of the housing 31, and then the opening is closed by the first cover 32. Similarly, various components such as the ECU substrate 80 are sequentially assembled to the other opening of the housing 31, and then the other opening is closed by the second cover 33. Therefore, the driving mechanism 21 is manufactured by assembling various components in one direction, whereby the manufacturing steps are simplified.

(10) When the key groove 70a of the switching knob 70 is operated from inside the passenger compartment, the operation force thereof is transmitted to the switching lever 56. Thus, children are not able to operate the switching knob 70 unnecessarily. In particular, the switching state immediately before the opening operation of the slide door 20 can be basically continued until the slide door 20 is closed by hiding the switching knob 70 when the slide door 20 is fully opened so that the passenger in the passenger compartment can operate the switching knob 70 only while the slide door 20 is closed. That is, the slide door 20 is electrically closed if electrically opened, and manually closed if manually opened, and hence the convenience is improved. When mounting the slide door 20 on both side portions of the vehicle, the passenger can select electric or manual for every slide door 20. In this case, the operation of the switching knob 70 is basically operated by the passenger operating the slide door 20. Thus, the switching knob 70 may not be operated by passengers other than the passenger operating the slide door 20 such as the driver.

(11) The dimension of the driving mechanism 21 is suppressed small in the short side direction of the driving motor 22 (stator 22a). In this case, the driving mechanism 21 is thinned, so that the mounting performance of the driving device on the vehicle improves.

The embodiment described above may be modified as below.

Figure 11:
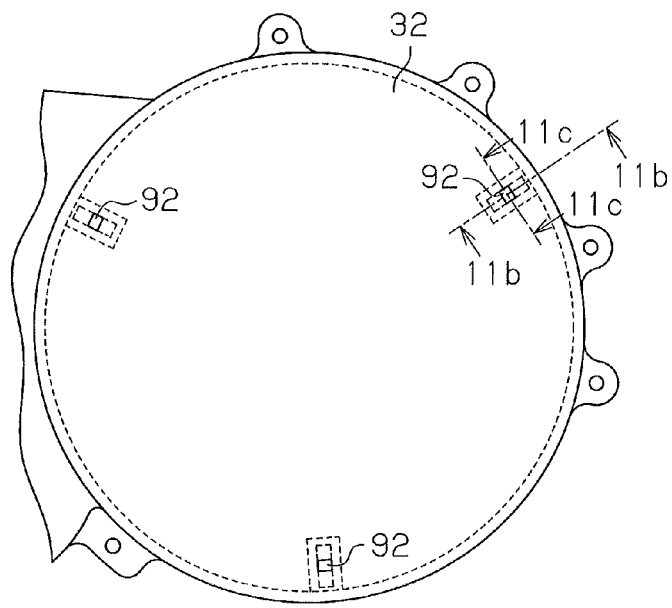
FIG. 11(a) is a front view showing a first cover of a modification.
FIG. 11(b) is a partial cross-sectional view taken along line 11b-11b of FIG. 11(a)
FIG. 11(c) is a cross-sectional view taken along line 11c-11c of FIG. 11(a)
FIG. 11(d) is a schematic diagram describing operation of a needle roller.
Figure 11:
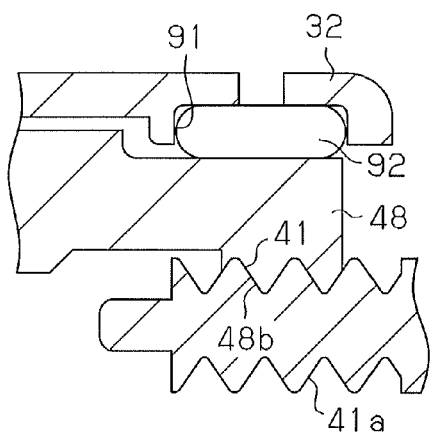
Figure 11:
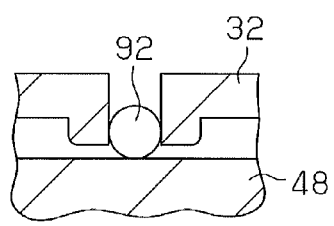
Figure 11:
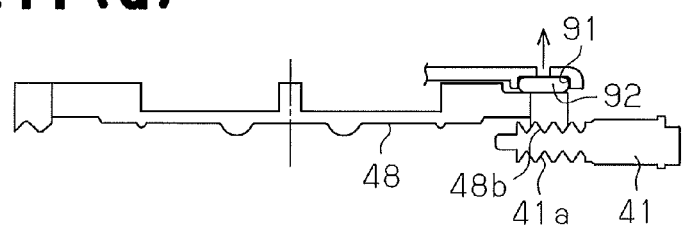

As shown in FIGS. 11(a) to 11(c), a plurality of roller supporting portions 91 may be formed at the outer peripheral edge of the first cover 32 (the case 30), and a needle roller 92 serving as a rolling member may be rotationally attached to each roller supporting portion 91. A portion where the needle roller 92 is fitted in the roller supporting portion 91 may be formed into an undercut shape so that the needle roller 92 assembled to the first cover 32 does not escape. Each needle roller 92 is rotationally brought into contact with a surface facing the first cover 32 of the transmission gear 48. In particular, the needle roller 92 is arranged at least at a position corresponding to a meshing portion of the disk gear portion 48b and the pinion 41 in the transmission gear 48. In this case, the transmission gear 48 can be prevented from bending in the axial direction thereof by the needle roller 92, as shown with an arrow in FIG. 11(d). Thus, a contacting portion of the thread portion 41a with the disk gear portion 48b, that is, the meshing portion of the disk gear portion 48b and the pinion 41 can be prevented from bending in the axial direction. Thus, the degradation of the gear efficiency between the pinion 41 and the disk gear portion 48b can be suppressed.

Figure 12:
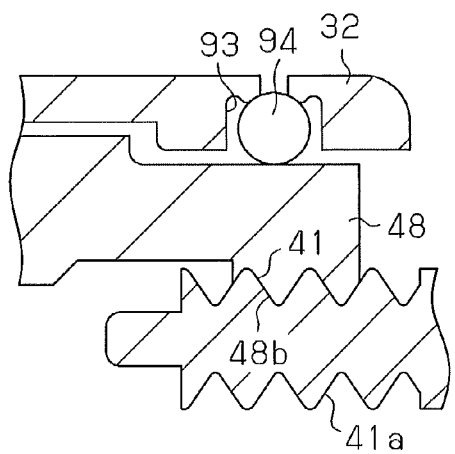
FIG. 12 is a partial cross-sectional view showing a first cover of a modification.
Figure 13:
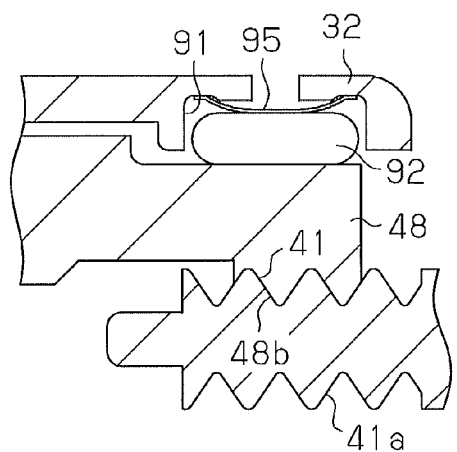
FIG. 13 is a partial cross-sectional view showing a first cover of a modification.
Figure 14:
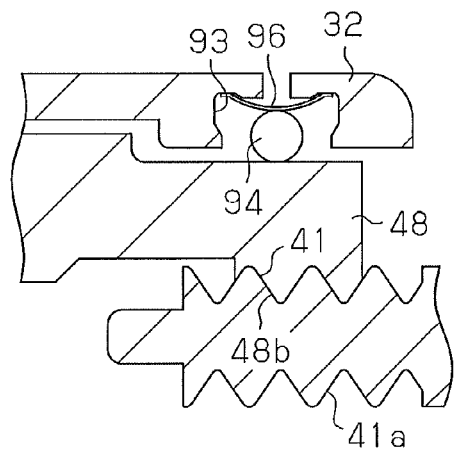
FIG. 14 is a partial cross-sectional view showing a first cover of a modification.

As shown in FIG. 12, a plurality of roller supporting portions 93 may be formed at the outer peripheral edge of the first cover 32, and a spherical object 94 serving as a rolling member may be rotationally attached to each roller supporting portion 93. As shown in FIG. 13, a spring body 95 for urging the needle roller 92 towards the transmission gear 48 may be attached to the roller supporting portion 91. As shown in FIG. 14, a spring body 96 for urging the spherical object 94 towards the transmission gear 48 may be attached to the roller supporting portion 93. The backlash that occurs between the components thus is reduced.

A projection may be formed towards the transmission gear 48 on the first cover 32 instead of the rolling member. With such a projection as well, the contacting portion of the thread portion 41a with the disk gear portion 48b, that is, the meshing portion of the disk gear portion 48b with the pinion 41 is prevented from bending.

The number of threads of the pinions 41 may be an even number of greater than or equal to four. Alternatively, the number of threads of the pinions 41 may be an odd number other than one. In this case, if the pinion 41 is made of metal and the thread portion 41a is formed by rolling, the accuracy of the thread portion 41a is not satisfactory unless the number is an even number, which may degrade the gear efficiency. Thus, if the number of pinions 41 is an odd number other than one, the pinion 41 needs to be made of plastic molding.

The generation of noise can be suppressed by forming either the thread portion 41a or the disk gear portion 48b with plastic and the other with metal. However, if the transmission gear 48 is made of plastic, the contacting portion of the thread portion 41a with the disk gear portion 48b may bend in the axial direction of the transmission gear 48, which may degrade the gear efficiency. The disk gear portion 48b made of plastic may be outsert molded to the transmission gear main body made of metal. Furthermore, a core rod may be insert molded in the transmission gear 48 made of plastic. The bending of the transmission gear 48 in the axial direction then can be suppressed.

If the direction the cables 24 and 25 are pulled when being reeled in or out from the drum 23 and the direction the cables 24 and 25 are pulled when being provided to the guiding pulley 27 match with each other, the intermediate pulley 26 may be omitted.

A driving motor including a mechanical clutch on a rotary shaft may be adopted to suppress the slide door 20 from opening and closing by its own weight when parked on a hill with the driving motor 22 and the drum 23 coupled to each other to rotate together. In this case, a small clutch is sufficient since the reverse input rotation can be restricted with a small torque of before the speed reduction.

The switching means (the switching lever 56 and the like) may be activated by an electrical operation.

The switching means (the switching lever 56 and the like) may be omitted. In this case, the slide door 20 may be opened and closed basically with only the electrical operation. In this case, the ring gear 46 serving as the fixed shaft is attached in a non-rotational manner with respect to the housing 31. The opening/closing position of the slide door 20 is correlated with the rotation position of the rotary shaft 22b of the driving motor 22. Thus, the rotation position of the rotary shaft 22b may be detected with a rotation sensor 82. The rotation sensor 82 may be omitted by using a motor incorporating a rotation sensor.

The case 30 (the housing 31, the first cover 32) merely needs to integrate and accommodate at least the drum 23, the transmission gear 48, the ring gear 46, and the carrier 47.

The driving mechanism 21 may be fixed to the body 10 of the vehicle. For example, when mounting the driving mechanism 21 on the quarter panel 10b, tensioners 28 and 29 are more preferably connected to the driving mechanism 21. Furthermore, when mounting the driving mechanism 21 on a step serving as platform of the door opening 10a, the belt pulley serving as the output member and the belt serving as the rope member are more preferably adopted.

The invention claimed is:

1. A vehicle door driving device comprising a driving mechanism, which is fixed to a vehicle body or to a vehicle door and includes a motor and an output member rotated by the motor, the vehicle door driving device being configured to open and close the vehicle door by rotating the output member, wherein
the output member is arranged to have at least a part thereof accommodated in a space corresponding to an external shape of the motor, the space being a space corresponding to a dimension in a radial direction of the motor, and
the driving mechanism includes
a pinion arranged on a rotary shaft of the motor and including a thread portion,
a transmission gear, which is arranged at a skew position with respect to the rotary shaft of the motor and has an axis extending in the radial direction, the transmission gear being freely rotational about an axis of the transmission gear, the transmission gear including a disk gear portion having a plurality of teeth and a sun gear, the disk gear portion being arranged to be annular on a surface facing the pinion of the transmission gear and capable of being meshed with and rolling relative to the thread portion of the pinion, and the sun gear being arranged on the same side as the pinion with respect to the disk gear portion,
a ring gear, which is coaxial with the transmission gear and arranged on an outer peripheral side of the sun gear, the ring gear forming a fixed shaft,
a carrier coupled to the output member to rotate with the output member, the carrier including a planet gear meshed with both the sun gear portion and the ring gear, and
a case that accommodates at least the output member, the transmission gear, the ring gear, and the carrier,
wherein a rolling member is rotationally supported by the case, and
the rolling member rotationally makes contact with a surface of the transmission gear on a side opposite to the pinion.

2. The vehicle door driving device according to claim 1, wherein
the output member is arranged coaxially with the ring gear, and
in the ring gear, the ring gear is accommodated with at least a part in the axial direction overlapped with the output member.

3. The vehicle door driving device according to claim 1, further comprising:
a switching means for switching to a state in which the rotation of the ring gear is restricted or a state in which the rotation of the ring gear is permitted; and
a cancel mechanism for canceling the state in which the rotation of the ring gear is restricted by the switching means, wherein
the switching means is arranged such that at least a part of the switching means is accommodated in the space corresponding to the dimension in the radial direction of the motor, and
when the rotation of the ring gear is restricted by the switching means, the cancel mechanism cancels the state in which the rotation of the ring gear is restricted by a load that is transmitted to the ring gear through the output member and the carrier with the opening and closing of the vehicle door and exceeds a predetermined value.

4. The vehicle door driving device according to claim 1, wherein the rolling member is arranged at least at a position corresponding to a meshing portion of the disk gear portion with the pinion.

5. The vehicle door driving device according to claim 1, wherein
the case includes a plurality of roller supporting portions at an outer peripheral edge of a portion having a disk shape, and
the rolling member is a needle roller rotationally supported by the roller supporting portion.

6. The vehicle door driving device according to claim 5, wherein
a part of the roller supporting portion to which the needle roller is fitted is formed into an undercut shape, and
the needle roller rotationally makes contact with a surface of the transmission gear that faces the case.

7. The vehicle door driving device according to claim 6, wherein the roller supporting portion includes a spring body that urges the needle roller toward the transmission gear.

8. The vehicle door driving device according to claim 1, wherein
a plurality of roller supporting portions are formed on an outer peripheral edge of the case, and
the rolling member is a spherical body rotationally supported by the roller supporting portion.

9. The vehicle door driving device according to claim 8, wherein the roller supporting portion includes a spring body that urges the spherical body toward the transmission gear.

10. The vehicle door driving device according to claim 1, wherein
either the thread portion of the pinion or the disk gear portion is made of plastic, and
the other one of the thread portion of the pinion or the disk gear portion is made of metal.

11. The vehicle door driving device according to claim 3, wherein
the vehicle door driving device opens and closes the vehicle door by reeling in and reeling out rope members provided on the output member as the output member rotates,
the vehicle door driving device further comprises a pulley mechanism around which a rope member to be reeled in by the output member and a rope member to be reeled out by the output member are respectively wound, the pulley mechanism guiding the rope members, and
the driving mechanism includes a case that accommodates the output member, the transmission gear, the ring gear, the carrier, the switching means, the cancel mechanism, and the pulley mechanism.

12. The vehicle door driving device according to claim 3, wherein
the switching means includes
an engagement portion formed on an outer peripheral surface of the ring gear,
an engaging/disengaging member arranged to be movable in a radial direction of the ring gear to engage with the engagement portion to restrict the rotation of the ring gear,
a rotational input member coupled to the engaging/disengaging member, the input member being rotated to engage the engaging/disengaging member with the engagement portion or disengage the engagement of the engaging/disengaging member and the engagement portion from each other, and
an urging means that urges the input member to a rotation position where the engaging/disengaging member and the engagement portion are engaged with each other.

13. A vehicle door driving device comprising a driving mechanism, which is fixed to a vehicle body or to a vehicle door and includes a motor and an output member rotated by the motor, the vehicle door driving device being configured to open and close the vehicle door by rotating the output member, wherein
the output member is arranged to have at least a part thereof accommodated in a space corresponding to an external shape of the motor, the space being a space corresponding to a dimension in a radial direction of the motor, and
the driving mechanism includes
a pinion arranged on a rotary shaft of the motor and including a thread portion,
a transmission gear, which is arranged at a skew position with respect to the rotary shaft of the motor and has an axis extending in the radial direction, the transmission gear being freely rotational about an axis of the transmission gear, the transmission gear including a disk gear portion having a plurality of teeth and a sun gear, the disk gear portion being arranged to be annular on a surface facing the pinion of the transmission gear and capable of being meshed with and rolling relative to the thread portion of the pinion, and the sun gear being arranged on the same side as the pinion with respect to the disk gear portion,
a ring gear, which is coaxial with the transmission gear and arranged on an outer peripheral side of the sun gear, the ring gear forming a fixed shaft, and
a carrier coupled to the output member to rotate with the output member, the carrier including a planet gear meshed with both the sun gear portion and the ring gear,
wherein the vehicle door driving device further comprises:
a switching means for switching to a state in which the rotation of the ring gear is restricted or a state in which the rotation of the ring gear is permitted; and
a cancel mechanism for canceling the state in which the rotation of the ring gear is restricted by the switching means;
wherein the switching means is arranged such that at least a part of the switching means is accommodated in the space corresponding to the dimension in the radial direction of the motor,
when the rotation of the ring gear is restricted by the switching means, the cancel mechanism cancels the state in which the rotation of the ring gear is restricted by a load that is transmitted to the ring gear through the output member and the carrier with the opening and closing of the vehicle door and exceeds a predetermined value,
the vehicle door driving device opens and closes the vehicle door by reeling in and reeling out rope members provided on the output member as the output member rotates,
the vehicle door driving device further comprises a pulley mechanism around which a rope member to be reeled in by the output member and a rope member to be reeled out by the output member are respectively wound, the pulley mechanism guiding the rope members, and
the driving device includes a case that accommodates the output member, the transmission gear, the ring gear, the carrier, the switching means, the cancel mechanism, and the pulley mechanism.

14. The vehicle door driving device according to claim 13, wherein
the switching means includes
an engagement portion formed on an outer peripheral surface of the ring gear,
an engaging/disengaging member arranged to be movable in a radial direction of the ring gear to engage with the engagement portion to restrict the rotation of the ring gear,
a rotational input member coupled to the engaging/disengaging member, the input member being rotated to engage the engaging/disengaging member with the engagement portion or disengage the engagement of the engaging/disengaging member and the engagement portion from each other, and
an urging means that urges the input member to a rotation position where the engaging/disengaging member and the engagement portion are engaged with each other.

* * * * *